United States Patent
Stevens

(10) Patent No.: US 8,285,923 B2
(45) Date of Patent: Oct. 9, 2012

(54) DISK DRIVE AND METHOD USING NATIVE COMMAND QUEUING TAGS TO IDENTIFY LOGICAL BLOCK SIZE AND IMPLEMENT PROTECTION INFORMATION

(75) Inventor: Curtis E. Stevens, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 666 days.

(21) Appl. No.: 12/330,375

(22) Filed: Dec. 8, 2008

(65) Prior Publication Data

US 2010/0146203 A1     Jun. 10, 2010

(51) Int. Cl.
G06F 13/00     (2006.01)
G06F 12/00     (2006.01)

(52) U.S. Cl. ........................................ 711/112; 711/171
(58) Field of Classification Search .................. 711/112, 711/171; 710/5, 39
See application file for complete search history.

(56) References Cited

U.S. PATENT DOCUMENTS

| | | | |
|---|---|---|---|
| 5,603,063 A | 2/1997 | Au | |
| 6,205,494 B1 | 3/2001 | Williams | |
| 6,286,061 B1 | 9/2001 | Ross | |
| 6,421,751 B1 | 7/2002 | Gulick | |
| 6,490,635 B1 | 12/2002 | Holmes | |
| 7,181,548 B2 | 2/2007 | Ellis et al. | |
| 7,225,395 B2 | 5/2007 | Henry | |
| 7,243,200 B2 | 7/2007 | Day et al. | |
| 7,272,745 B2 | 9/2007 | Seto | |
| 7,689,744 B1 * | 3/2010 | McCarty et al. | 710/74 |
| 2004/0264284 A1 | 12/2004 | Priborsky et al. | |
| 2005/0027894 A1 | 2/2005 | Ayyavu et al. | |
| 2005/0044349 A1 * | 2/2005 | Henry | 713/150 |
| 2005/0186832 A1 | 8/2005 | Nemazie | |
| 2007/0005896 A1 | 1/2007 | Chang et al. | |
| 2007/0011360 A1 | 1/2007 | Chang et al. | |

OTHER PUBLICATIONS

Serial ATA II Native Command Queuing Overview, Intel Corp. Application Note (Order No. 252664-002), Apr. 2003, pp. 1-21.*
Serial ATA II: Extensions to Serial ATA 1.0a, Revision 1.2, Aug. 27, 2004, Technical Editor Amber Huffman, pp. i-106.*
Clark, "Supercharging SATA Drive Performance: Native Command Queuing Makes SATA Viable in Workstation, Server Applications," Computer Technology Review, vol. 25, No. 4, Jun./Jul. 2005, pp. 1, 11, 32.*
Dees, "Native Command Queuing-Advanced Performance in Desktop Storage," IEEE Potentials, vol. 24, No. 4, Oct.-Nov. 2005, pp. 4-7.*

(Continued)

*Primary Examiner* — Sanjiv Shah
*Assistant Examiner* — Glenn Gossage

(57) ABSTRACT

"A disk drive is disclosed comprising a head actuated over a disk wherein a Native Command Queuing (NCQ) access command is received from a host. The NCQ access command comprises at least one logical block address (LBA) associated with a logical block, and a tag field for identifying the access command. The tag field is evaluated to determine a size of the logical block, and the logical block is transferred between the disk drive and the host. The logical block comprises user data and protection information for implementing end-to-end protection. The tag field comprises a tag number selected from a range of numbers, where the range of numbers comprise a first range of numbers for identifying a logical block comprising user data and protection information, and a second range of numbers for identifying a logical block comprising user data without protection information."

16 Claims, 5 Drawing Sheets

OTHER PUBLICATIONS

Huffman, "Comparing Serial ATA Native Command Queuing (NCQ) and ATA Tagged Command Queuing (TCQ)," Intel Corp. Whitepaper, Oct. 2003, pp. 1-4.*

Mark Evans, "Information technology—SCSI Block Commands—3 (SBC-3)", T10/1799-D, Revision 14, Mar. 20, 2008, http://www.t10.org/ftp/t10/drafts/sbc3/sbc3r14.pdf, pp . i-174.

Amber Huffman, Joni Clark, "Serial ATA Native Command Queuing", Jul. 2003, http://www.seagate.com/content/pdf/whitepaper/D2c_tech_paper_intc-stx_sata_ncq.pdf, pp. 1-12.

Serial ATA International Organization: Serial ATA Revision 2.6, Feb. 15, 2007, pp. iii-600.

John Masiewicz, Information technology—AT Attachment with Packet Interface—7, vol. 2, Parallel Transport Protocols and Physical Interconnect (ATA/ATAPI-7 V2), T13/Project 1532D vol. 2, Revision 4b, Apr. 21, 2004, http://www.t13.org/Documents/Uploaded-Documents/docs2007/D1532v2r4b-AT_Attachment_with_Packet_Interface_-_7_Volume_2.pdf. , pp. i-229.

Curtis E. Stevens, "Information technology—AT Attachment 8—ATA/ATAPI Command Set (ATA8-ACS)", T13/1699-D, Revision 6, Jun. 25, 2008, http://www.t13.org/Documents/Uploaded-Documents/docs2008/D1699r6-ATA8-ACS.pdf.

* cited by examiner

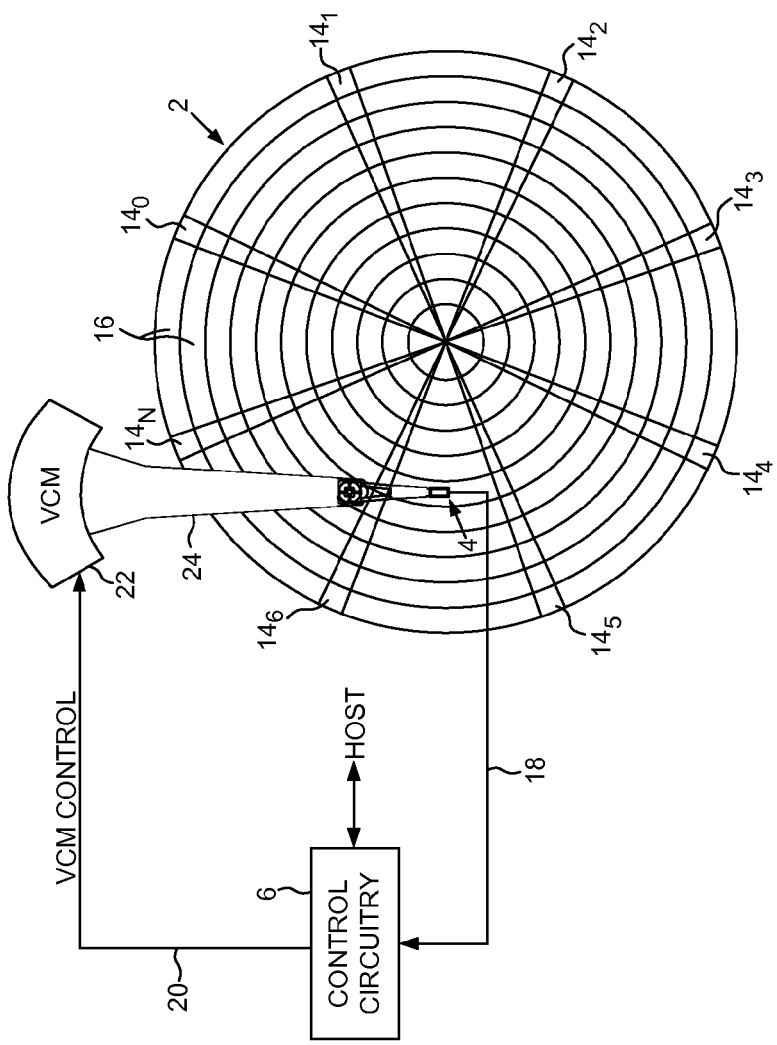
FIG. 1A
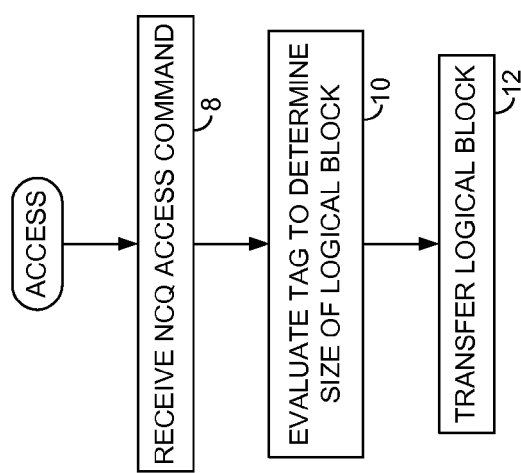
FIG. 1B
| TAG | DESCRIPTION |
|---|---|
| 0 - N | LOGICAL BLOCK = A BYTES |
| (N+1) - M | LOGICAL BLOCK = B BYTES (A>B) |
FIG. 1C

SERIAL ATA NCQ READ/WRITE COMMAND

| NAME | DESCRIPTION |
|---|---|
| FEATURE | The number of logical sectors to be transferred. A value of 0000h Indicates that 65,536 logical sectors are to be transferred. |
| COUNT | Bit Description<br>15:8    Reserved<br>7:3     NCQ Tag<br>2:0     Reserved |
| LBA | LBA of first logical sector to be transferred. |
| DEVICE | Bit Description<br>7       FUA<br>6       Shall be set to one<br>5       Reserved<br>4       Shall be set to zero<br>3:0     Reserved |
| COMMAND | 60h = READ COMMAD    61h = WRITE COMMAND |

FIG. 2
(Prior Art)

| TAG | DESCRIPTION |
|---|---|
| 0 - 5 | No protection information transferred (512 byte logical block) |
| 6 - 10 | Check CRC (520 byte logical block) |
| 11 - 20 | Check CRC and LBA (520 byte logical block) |
| 21 - 31 | No protection information transferred (520 byte logical block) |

FIG. 3

DISK DRIVE AND METHOD USING NATIVE COMMAND QUEUING TAGS TO IDENTIFY LOGICAL BLOCK SIZE AND IMPLEMENT PROTECTION INFORMATION

BACKGROUND

Description of the Related Art

"Disk drives may be manufactured according to various communication/interface protocols, such as Integrated Drive Electronics (IDE), parallel and serial Small Computer Systems Interface (SCSI), and parallel and serial Advanced Technology Attachment (ATA). Each protocol is typically reviewed and approved by a standards committee which publishes a specification followed by disk drive and operating system manufactures. The specification includes the parameters for implementing write/read commands, such as a starting logical block address (LBA), number of logical blocks to write/read, and the number of data bytes to transfer per logical block (e.g., 512, 1024, 2048, etc.). Certain protocols may also specify additional bytes of protection information to be transferred with each logical block in order to implement "end-to-end" protection from the host, through the disk drive control circuitry and buffers, and optionally to the disk during write operations, and then optionally back to the host during read operations. For example, SCSI disk drives may implement a T10 protocol (as defined by the International Committee for Information Technology Standards at incits.org) which specifies an additional eight bytes of information transferred with each logical block, including two bytes of cyclical redundancy check (CRC) data, two bytes of application data, and a four byte reference tag that identifies the LBA of the logical block. This additional protection information helps protect against spurious data errors that may occur as the data is transferred between the host and the disk drive, as well as unknown firmware errors in the disk drive that may inadvertently corrupt or mishandle the data as it is written to and optionally read from the disk."

"The current protocol employed in Native Command Queuing (NCQ) for Serial ATA disk drives (as defined by the SATA-IO Administration at serialata.org) does not include protection information for implementing end-to-end protection. It would therefore be desirable to implement protection information for NCQ Serial ATA disk drives without requiring the standards committee to adopt a modification to the current protocol."

BRIEF DESCRIPTION OF THE DRAWINGS

FIG. 1A shows a disk drive according to an embodiment of the present invention comprising a disk, a head actuated over the disk, and control circuitry.

FIG. 1B is a flow diagram executed by the control circuitry to receive a NCQ access command including a tag field for determining the number of bytes to transfer for each logical block according to an embodiment of the present invention.

FIG. 1C shows an example format of the tag field wherein a tag number is selected from a range of numbers, and each range identifies a logical block size.

"FIG. 2 shows an example conventional format of a NCQ read/write command including the tag field."

FIG. 3 shows an example format of the tag field wherein a tag number is selected from a range of numbers, and each range specifies a type of protection information included with the logical block.

DETAILED DESCRIPTION OF EMBODIMENTS OF THE INVENTION

Figure 4:
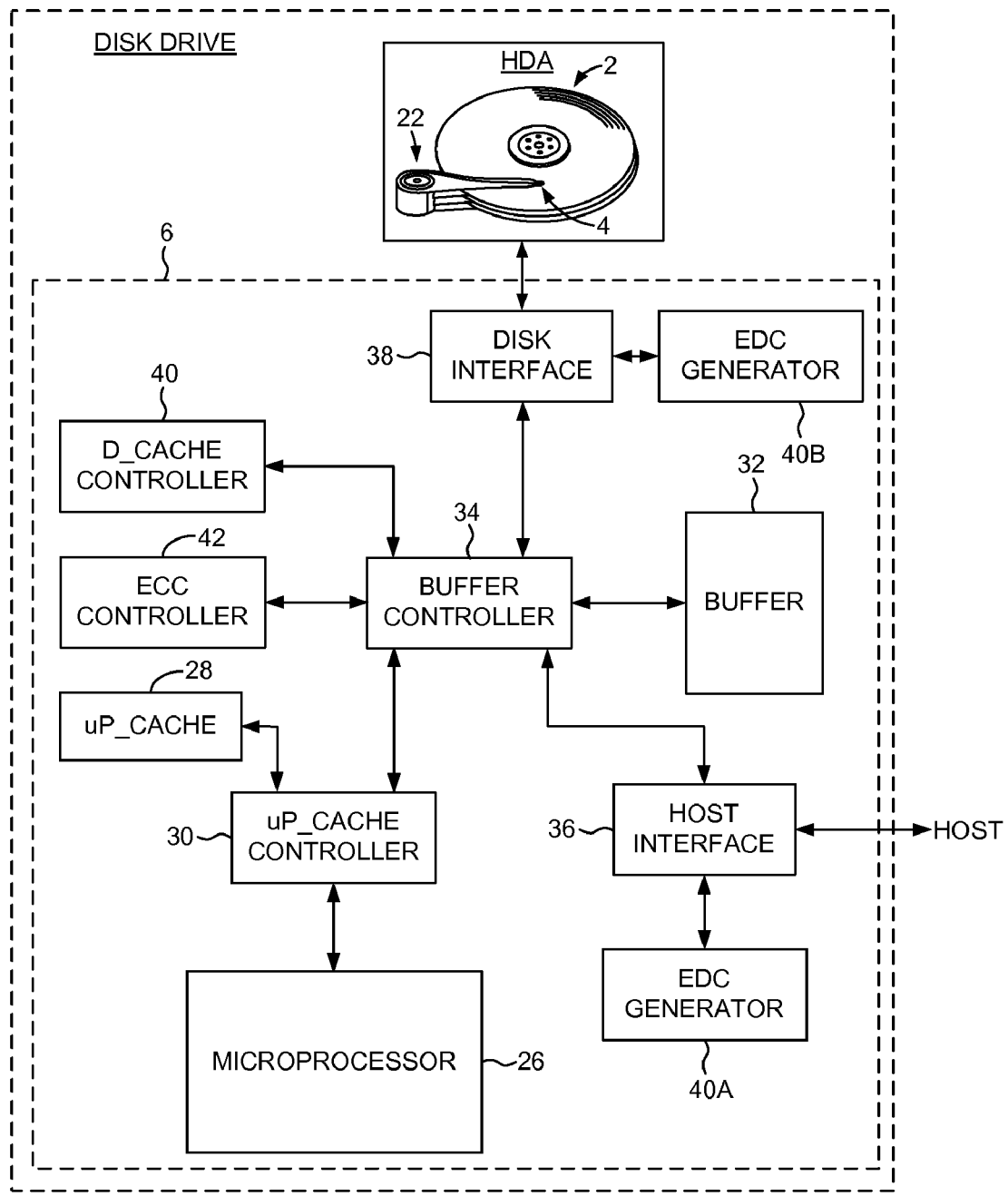
FIG. 4 shows example control circuitry according to an embodiment of the present invention, including an error detection code (EDC) generator for processing the protection information.

"FIG. 1A shows a disk drive according to an embodiment of the present invention comprising a disk 2 and a head 4 actuated over the disk 2. The disk drive further comprises control circuitry 6 operable to execute the flow diagram shown in FIG. 1B. A Native Command Queuing (NCQ) access command is received from a host (step 8), wherein the NCQ access command comprises at least one logical block address (LBA), and a tag field for identifying the access command. The tag field is evaluated to determine a size of the logical block (step 10) in order to transfer the logical block between the disk drive and the host (step 12). FIG. 1C illustrates an embodiment of the present invention wherein the tag field comprises a tag number selected from a range of numbers, including a first range (0-N) that identifies a first logical block size, and a second range ((N+1)-M) that identifies a second logical block size."

"In the embodiment of FIG. 1A, the disk 2 comprises a plurality of embedded servo sectors $14_0$-$14_N$ which define a plurality of data tracks 16. Each servo sector $14_i$ comprises head positioning information such as a track address for coarse positioning during seeks, and servo bursts for fine positioning while tracking the centerline of a target track during write/read operations. The control circuitry 6 processes a read signal 18 emanating from the head 4 to demodulate the servo sectors into a position error signal (PES). The PES is filtered with a suitable compensation filter to generate a control signal 20 applied to a voice coil motor (VCM) 22 which rotates an actuator arm 24 about a pivot in a direction that reduces the PES."

"FIG. 2 shows a conventional format for a Serial ATA NCQ read/write access command (see AT Attachment 8—ATA/ATAPI (Advanced Technology Attachment Peripheral Interface) Command Set (ATA8-ACS)), including the tag field (bits 7:3 of the COUNT field). Conventionally, the tag field is used to correlate the write/read data with the pending access commands initiated by the host and received by the disk drive. Since the access commands may be queued in the disk drive, the host may initiate several access commands which may be processed by the disk drive in any suitable order (e.g., using a rotational position optimization (RPO) algorithm). When the disk drive selects a command from the command queue to execute, the tag field is used to correlate the command with the write/read data. In the past, a tag number in the tag field was simply incremented to identify each new access command. The present invention expands on the definition of the tag field so that not only does the tag number identify a pending access command, it also identifies a size of the logical block associated with the access command."

In one embodiment, the logical block sizes may be different depending on whether the logical block comprises protection information for implementing end-to-end protection (from the host, through the disk drive control circuitry and buffers, and optionally to the disk during write operations, and then optionally back to the host during read operations). In an example embodiment shown in FIG. 3, the tag field comprises a tag number between 0 and 31, wherein tag numbers from 0-5 identify access commands having no protection information (e.g., 512 byte logical blocks), tag numbers 6-10 identify access commands comprising check data (e.g., CRC bytes) generated over the user data (e.g., 520 byte logical blocks), tag numbers 11-20 identify access commands comprising check data and an LBA reference field for identifying the LBA of the access command (e.g., 520 byte logical blocks), and tag numbers 21-31 identify access commands having no protection information (e.g., 520 byte logical blocks).

In one embodiment, the host configures the NCQ access command including the tag field with a tag number corresponding to the type of access command (i.e., the size of logical bock). In one embodiment, for each new access command of the same type, the host simply increments the tag number within the corresponding range. In one embodiment, the host may query the disk drive to determine the ranges of tag numbers and corresponding logical block sizes (and whether protection information is implemented). In another embodiment, the host may configure the disk drive with the desired tag number ranges for identifying the access commands, including logical block size and protection information features. In one embodiment, the host may skew the tag number ranges if access commands having a particular logical block size will occur more frequently.

"FIG. 4 shows a disk drive according to an embodiment of the present invention wherein the control circuitry 6 of FIG. 1A comprises a number of components, including a microprocessor (uP) 26 for executing code segments of a control program. The microprocessor 26 typically accesses a fast uP cache 28 (e.g., a static random access memory (SRAM)) through a uP cache controller 30 which caches op codes being executed as well as program data. The code segments of the control program are typically stored on the disk 2 and loaded into a buffer memory 32 (e.g., a synchronous dynamic random access memory (SDRAM)) when the disk drive is powered on. As the microprocessor 26 executes the control program, the uP cache controller 30 transfers a burst of corresponding op codes from the buffer memory 32 external to the uP into the uP cache 28 for fast access by the microprocessor 26. Since the buffer memory 32 is typically shared with other control components, a buffer controller 34 implements an arbitration algorithm to arbitrate access to the buffer memory 32. Example control components that may share access to the buffer memory 32 include a host interface 36, a disk interface 38, a data cache controller 40, and an error correction code (ECC) controller 42, one or more of which may be integrated with the microprocessor 26 in a system on a chip (SOC), or implemented as separate integrated circuits."

"In one embodiment, the control circuitry 6 comprises the microprocessor 26 executing instructions, the instructions being operable to cause the microprocessor 26 to perform the steps described in the flow diagrams, as well as other functions described herein. The instructions may be stored in any computer-readable medium. In one embodiment, they may be stored on a non-volatile semiconductor memory (not shown) external to the microprocessor, or integrated with the microprocessor in a SOC. In another embodiment, the instructions are stored on the disk 2 and read into a volatile semiconductor memory when the disk drive is powered on. In yet another embodiment, the control circuitry 6 comprises suitable logic circuitry, such as state machine circuitry."

The host interface 36 facilitates data transfer between the disk drive and the host during read and write operations. During a write operation, the host interface 36 stages the write data received from the host in the buffer memory 32 before it is written to the disk 2. In the embodiment wherein the host implements data path protection, the host interface 36 uses an EDC generator 40A to generate check data over the write data (and optionally the LBA) received from the host. The check data generated by the host interface 36 are compared with the check data received with the write command to verify the write data is received from the host error free. The EDC generator 40A may comprise any suitable circuitry, such as a suitable generator polynomial, for generating any suitable check data, such as cyclical redundancy check (CRC) data. The host interface 36 stores the write data and check data (and optionally the LBA) in the buffer memory 32. The microprocessor 26 typically executes a scheduling algorithm (e.g., an RPO algorithm) for executing the write command at an appropriate time, for example, when the head 4 is near the target data sectors corresponding to the write command.

"The disk interface 38 performs the actual interface functions with the head disk assembly (HDA) in order to write the data stored in the buffer memory 32 to the disk 2. When executing the write command, the disk interface 38 reads the write data from the buffer memory 32 and may use an EDC generator 40B to generate check data over the write data (and optionally the LBA). The disk interface 38 then compares the check data stored in the buffer memory 32 to the generated check data to detect if any errors occurred. If an error is not detected, the disk interface 38 executes the write operation by writing the write data to the target data sectors on the disk 2, which may or may not include the check data (and optionally the LBA)."

During a read operation, the disk interface 38 reads the data from the data sectors identified by the LBA received from the host. If the check data is not stored on the disk 2, the disk interface 38 may generate check data over the read data (and optionally the LBA) using the EDC generator 40B, and then store the data and the check data in the buffer memory 32. When the host interface 36 is ready to transfer the data to the host, the host interface 36 reads the data from the buffer memory 32 and generates check data over the data (and optionally the LBA) using the EDC generator 40A. The host interface 36 compares the check data stored in the buffer memory 32 to the generated check data to detect if an error occurred. If an error is not detected, the host interface 36 transmits the data to the host, and if the host implements data path protection, the host interface 36 also transmits the check data to the host.

The ECC controller 42 implements a suitable error correction algorithm on data read from the disk 2 and staged in the buffer memory 32. In one embodiment, the disk interface 36 waits until the ECC controller 42 is finished correcting the data staged in the buffer memory 32 before generating the check data over the data (and optionally the LBA). In this manner, the EDC data is generated during a read operation over the corrected data sectors. In an alternative embodiment, the disk interface 38 generates the check data as the data is read from the disk 2 and stores the check data in the buffer memory 32. If the ECC controller 42 makes a subsequent correction to the data in the buffer memory 32 (e.g., using a software ECC algorithm), the ECC controller 42 updates the corresponding check data using any suitable technique. For example, the correction symbols generated by the ECC controller 42 can be used to update the check data to reflect the corrections made to the data staged in the buffer memory 32.

Figure 5A:
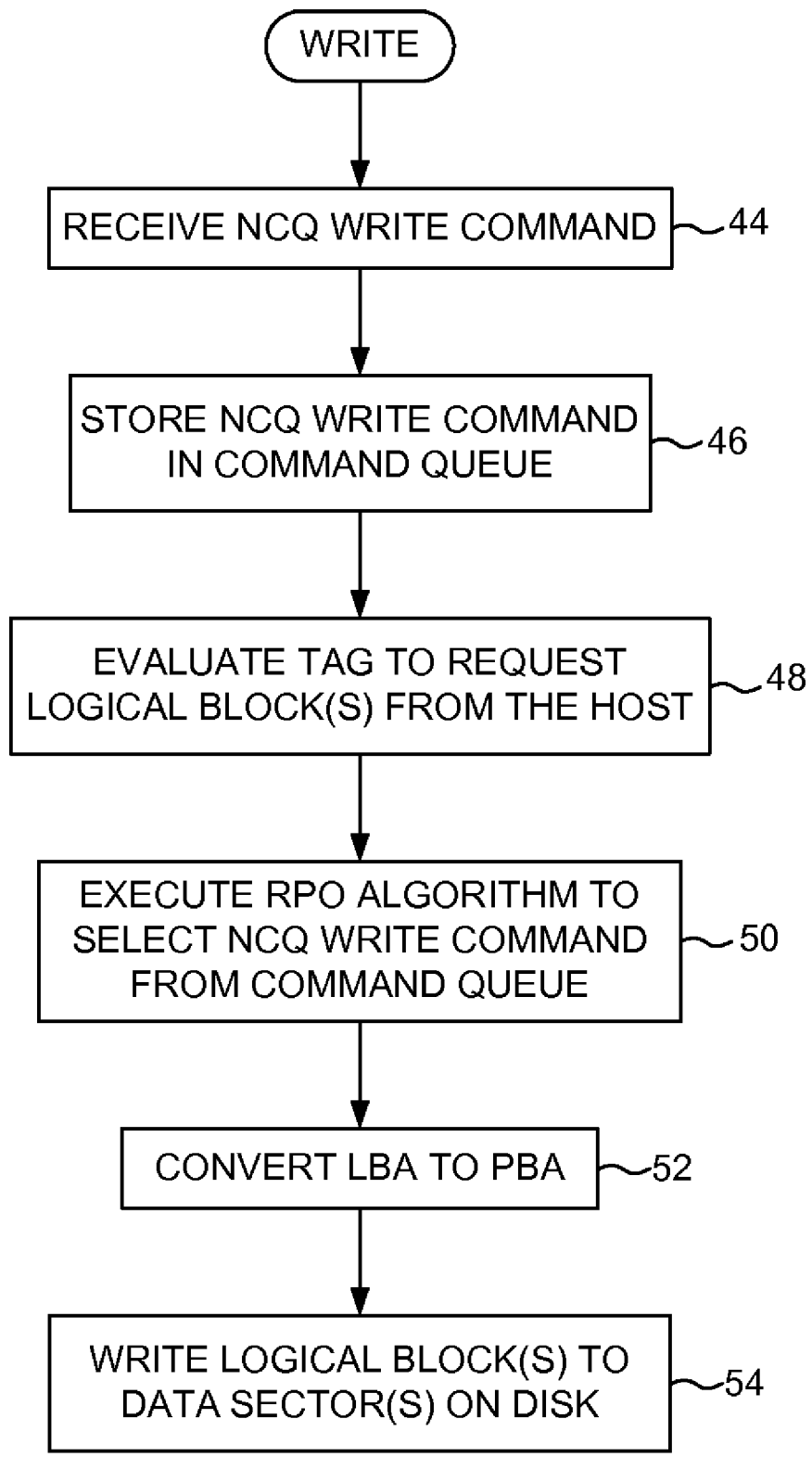
FIG. 5A is a flow diagram according to an embodiment of the present invention wherein a NCQ write command is stored in a command queue and then selected using a rotational position optimization (RPO) algorithm.

"FIG. 5A shows a flow diagram according to an embodiment of the present invention for implementing a NCQ write command. When the disk drive receives the NCQ write command from the host (step 44), the command is stored in a command queue (step 46) rather than immediately executed. If write caching is enabled, the tag field of the write command is evaluated (step 48) in order to request the corresponding logical block(s) of write data from the host and to cache the write data in the buffer 32 of FIG. 4. The control circuitry 6 also evaluates the tag field in order to determine the size of the logical block(s) that will be received from the host, and optionally whether the logical block(s) comprise(s) check data. Referring to the embodiment of FIG. 3, if the tag of the write command is in the range of 0-5 or 21-31, then the logical block(s) received from the host does (do) not include check data, and as described above, control circuitry 6 may generate check data internally and append the check data to the logical block(s). If the tag is in the range of 6-10 or 11-20, then the logical block(s) received from the host include(s) check data which is processed as described above with reference to FIG. 4."

"The control circuitry 6 executes a suitable scheduling algorithm (e.g., an RPO algorithm) in order to select the NCQ write command from the command queue at an optimal time (step 50). In one embodiment, the tags of the queued commands may be evaluated by the scheduling algorithm to help prioritize the commands (i.e., the tag ranges may be assigned different priorities). When a write command is selected from the command queue, the control circuitry 6 converts the LBA(s) to a corresponding physical block address(es) PBA(s) (step 52) and then writes the logical block(s) to corresponding data sector(s) on the disk 2 (step 54). If write caching is disabled, then after selecting the write command from the command queue, the control circuitry 6 evaluates the tag in order to request the write data from the host which is then written to the disk."

Figure 5B:
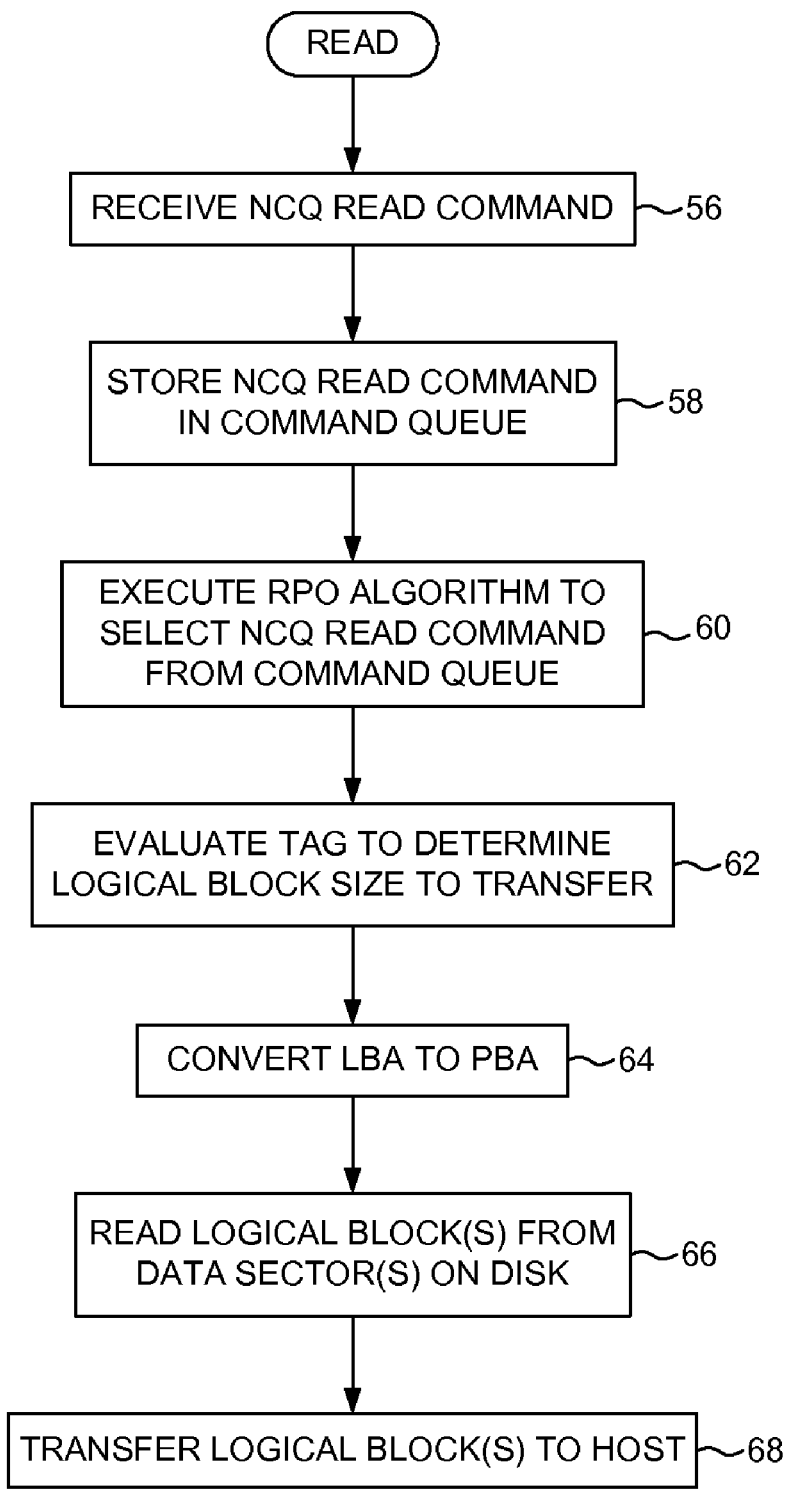
FIG. 5B is a flow diagram according to an embodiment of the present invention wherein a NCQ read command is stored in a command queue and then selected using a RPO algorithm.

FIG. 5B shows a flow diagram according to an embodiment of the present invention for implementing a NCQ read command. When the disk drive receives the NCQ read command from the host (step 56), the command is stored in a command queue (step 58) rather than immediately executed. In this manner, the control circuitry 6 can execute a suitable scheduling algorithm (e.g., an RPO algorithm) in order to select the NCQ read command from the command queue at an optimal time (step 60). As described above, the scheduling algorithm may evaluate the tags of the queued commands to help prioritize the commands.

"When a read command is selected from the command queue, the control circuitry 6 evaluates the tag field to determine the size of the logical block(s) to read from the disk and transfer to the host (step 62), including whether to transfer check data with each logical block based on the range of the tag as described above. The control circuitry 6 converts the LBA(s) in the command into PBA(s) (step 64) and reads the logical block(s) from the corresponding data sector(s) (step 66). The control circuitry 6 then uses the tag field to transfer the logical block(s) to the host (step 68). That is, the tag field is used to notify the host that the logical block(s) being transferred correspond(s) to a particular read command previously initiated by the host. If the read data of a read command is cached, then the control circuitry 6 may execute the read command immediately by transferring the cached data to the host using the tag field rather than queuing the command in the command queue."

What is claimed is:

1. A disk drive comprising:
   a disk;
   a head actuated over the disk; and
   control circuitry operable to:
   receive a Native Command Queuing (NCQ) access command from a host, wherein the NCQ access command comprises at least one logical block address (LBA) associated with a logical block, and a tag field for identifying the access command;
   evaluate the tag field to determine a size of the logical block; and
   transfer the logical block between the disk drive and the host,
   wherein:
   the logical block comprises user data and protection information for implementing end-to-end protection; and
   the tag field comprises a tag number selected from a range of numbers, the range of numbers comprising:
   a first range of numbers for identifying a logical block comprising user data and protection information; and
   a second range of numbers for identifying a logical block comprising user data without protection information.

2. The disk drive as recited in claim 1, wherein the protection information comprises check data generated over the user data.

3. The disk drive as recited in claim 1, wherein the protection information comprises an LBA reference field for identifying the at least one LBA.

4. The disk drive as recited in claim 1, wherein the protection information comprises check data generated over the user data.

5. The disk drive as recited in claim 1, wherein the protection information comprises an LBA reference field for identifying the at least one LBA.

6. The disk drive as recited in claim 1, wherein the disk drive comprises a Serial Advanced Technology Attachment (SATA) disk drive.

7. The disk drive as recited in claim 1, wherein the control circuitry is further operable to:
   store the NCQ access command in a command queue;
   select the NCQ access command from the command queue; and
   evaluate the tag field in order to transfer the logical block between the disk drive and the host.

8. The disk drive as recited in claim 7, wherein the control circuitry is further operable to:
   convert the at least one LBA into a physical block address (PBA); and
   write at least part of the logical block to a data sector on the disk associated with the PBA.

9. A method of operating a disk drive, the disk drive comprising a disk and a head actuated over the disk, the method comprising:
   receiving a Native Command Queuing (NCQ) access command from a host, wherein the NCQ access command comprises at least one logical block address (LBA) associated with a logical block, and a tag field for identifying the access command;
   evaluating the tag field to determine a size of the logical block; and
   transferring the logical block between the disk drive and the host,
   wherein:
   the logical block comprises user data and protection information for implementing end-to-end protection; and the tag field comprises a tag number selected from a range of numbers, the range of numbers comprising:
- a first range of numbers for identifying a logical block comprising user data and protection information; and
- a second range of numbers for identifying a logical block comprising user data without protection information.

10. The method as recited in claim 9, wherein the protection information comprises check data generated over the user data.

11. The method as recited in claim 9, wherein the protection information comprises an LBA reference field for identifying the at least one LBA.

12. The method as recited in claim 9, wherein the protection information comprises check data generated over the user data.

13. The method as recited in claim 9, wherein the protection information comprises an LBA reference field for identifying the at least one LBA.

14. The method as recited in claim 9, wherein the disk drive comprises a Serial Advanced Technology Attachment (SATA) disk drive.

15. The method as recited in claim 9, further comprising:
storing the NCQ access command in a command queue;
selecting the NCQ access command from the command queue; and
evaluating the tag field in order to transfer the logical block between the disk drive and the host.

16. The method as recited in claim 15, further comprising:
converting the at least one LBA into a physical block address (PBA); and
writing at least part of the logical block to a data sector on the disk associated with the PBA.

* * * * *